United States Patent Office 3,071,913
Patented Jan. 8, 1963

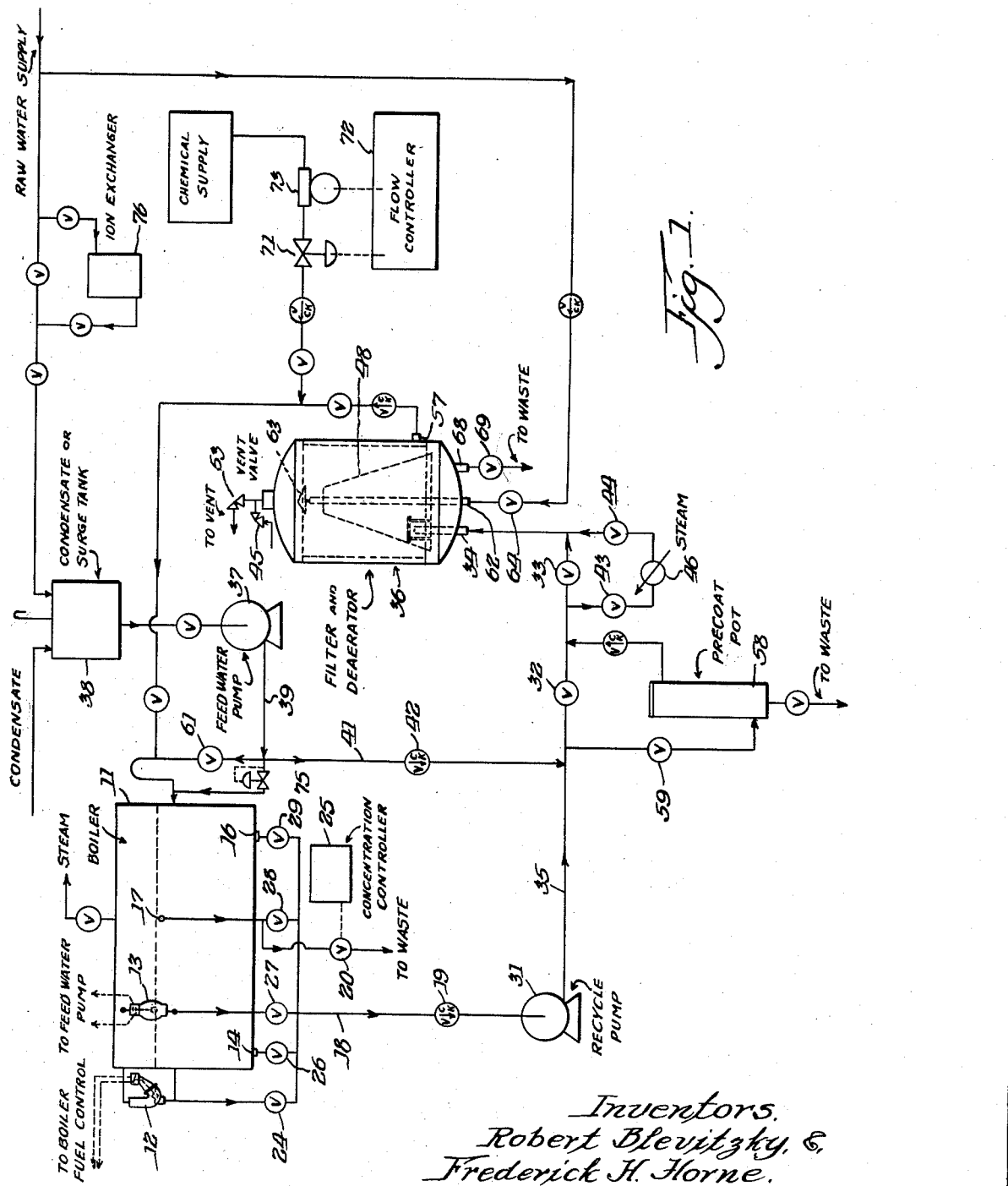

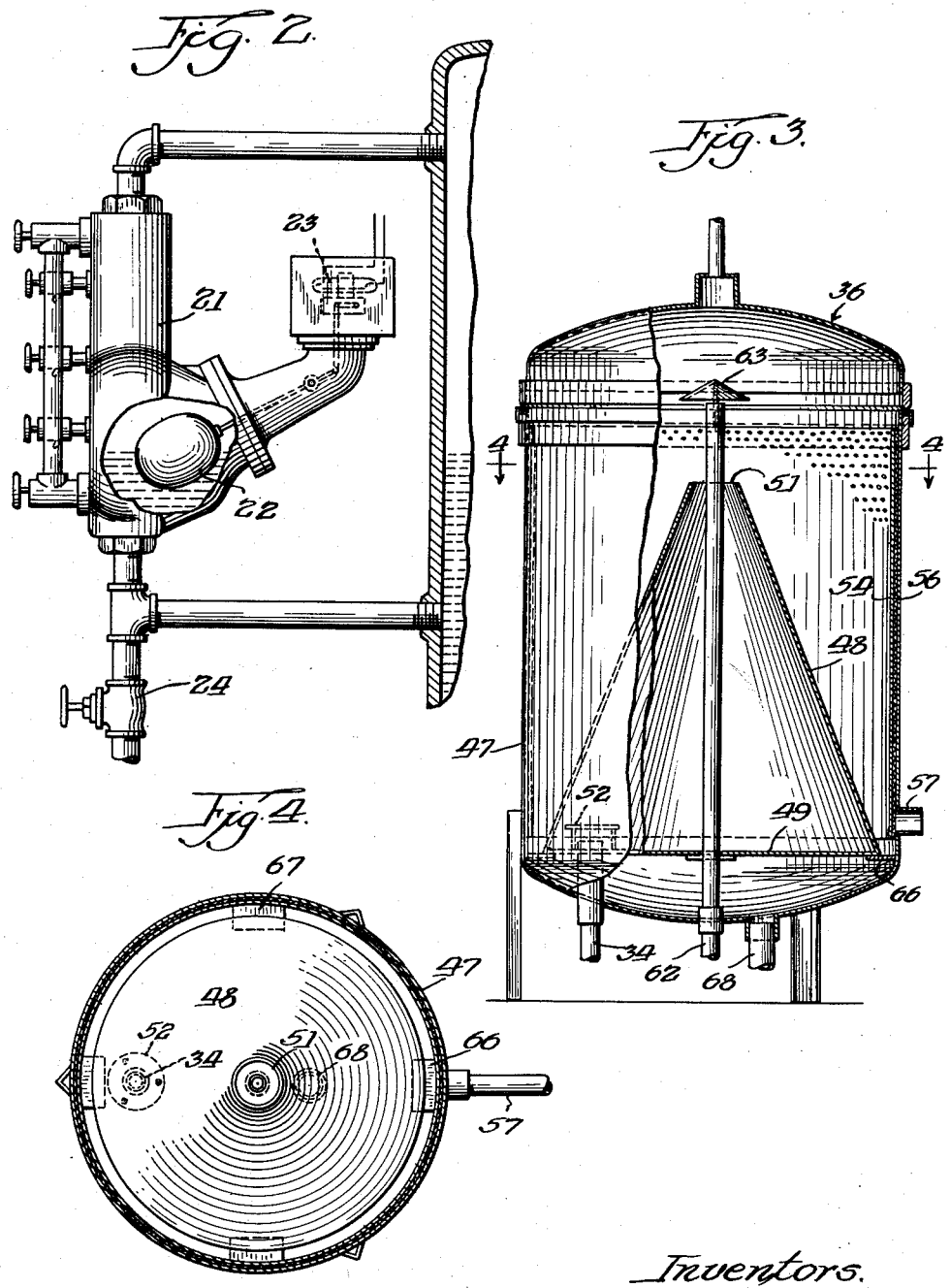

3,071,913
APPARATUS FOR TREATING BOILER WATER
Robert Blevitzky, 541 W. Roscoe St., Chicago, Ill., and Frederick H. Horne, 541 Prospect St., Lake Bluff, Ill.
Filed Oct. 30, 1958, Ser. No. 770,668
5 Claims. (Cl. 55—201)

This invention relates to the treatment of boiler water and more particularly pertains to an apparatus for treating boiler water whereby the problems occasioned by corrosion and the formation of precipitates and scale in the boiler and the associated system are eliminated or substantially reduced.

The proper conditioning of the water used in the operation of steam boilers is a major problem associated with this operation. At the elevated temperatures and pressures which are found in steam generating boilers corrosion of the equipment caused by certain chemical constituents of the feed water is likely to be severe unless suitable precautionary measures are taken. A further difficulty arises from the formation of insoluble products of such corrosion as may occur. Some of these products float on the surface of water; others settle to the bottom of the boiler and collect in the form of sludge; still others are suspended in the boiler water. The floating materials may also collect in control elements associated with the boiler and cause malfunctioning of the same. Still another problem consists of scaling, i.e., the precipitation of certain minerals, such as the carbonates, silicates, and sulfates of calcium and magnesium and oxides or hydroxides of iron which cover the walls and tubing of the boiler and prevent the efficient operation thereof by acting as a barrier to the transfer of heat and causing excessive metal temperatures on the flame side of the heat transfer surfaces. In addition, control and removal of suspended solids by conventional means entails discharge of excessive quantities of boiler water to waste, such excesses being above and beyond that required to maintain proper total dissolved solids concentrations. Furthermore, in many types of boilers it is impossible to remove the necessary quantities of suspended solids, said solids then accumulating on the boiler surfaces and causing boiler failure or necessitating costly cleaning procedures.

In accordance with the present invention, there is provided a novel combination deaerator and filter which permits both deaeration and filtering to be performed within one vessel in a more economical manner than has hitherto been possible.

The invention will be better understood from the following description thereof in conjunction with the accompanying drawings, wherein like reference numera's are used to identify the same elements in the several views. In the figures:

FIGURE 1 is a schematic flow diagram of a boiler and associated treatment system including a combination deaerator and filter embodying the principles of the present invention;

FIGURE 2 is a detailed drawing of a float-actuated control device used in the boiler and associated treatment system of FIGURE 1;

FIGURE 3 is a side view of the combination deaerator and filter of FIGURE 1, illustrated with a portion of the side-wall cut away to show the inner construction; and, FIGURE 4 is a sectional view along the line 4—4 of FIGURE 3.

The invention will be exemplified in its application to a typical steam boiler installation rated at about 500 boiler horse power operating at about 15 p.s.i.g. Such a boiler typically has a capacity of about 2,200 gallons and produces about 17,000 lb./hour of 15 p.s.i.g. steam. It will be obvious, however, that the invention has general applicability to any steam boiler and is not limited to any particular size or pressure rating.

Referring to FIGURE 1, it can be seen that boiler 11 has certain float-actuated controls associated with it, such as the low water cut-off 12 and the water-level control 13. Controls of this type are commonly required by law in order to insure the safe operation of the boiler. Low water cut-off 12 (see also FIG. 2 for one suitable form thereof) serves to cut-off the fuel supply to the boiler in appropriate fashion, e.g., by closing the boiler fuel supply valve (not shown) and interrupting the ignition sys em in the event that the water level therein drops to a dangerously low level. Water level control 13 (which may be any well known and standard type as marketed and sold) as its name implies, controls the normal operating level of water in the boiler. When the level falls to the minimum level in its normal operating range this control operates to start the feed water pump, thereby supplying more water to the boiler until the upper limit of the normal water level is reached, at which point the control stops the pump.

As shown in FIGURE 2, a water level control of this type commonly comprises a housing 21 containing a float 22, which rides on the water level and actuates a switch 23, associated therewith which controls the operation of the aforementioned valves and pumps. It is well known that solid materials in the water in the boiler tend to accumulate in the housings of these controls and may interfere with or entirely prevent the operation of these controls. In order to overcome this problem it is common practice in the operation of steam boilers to periodically flush the control housing by opening a valve, e.g. 24, and permitting a stream of water to discharge from the housing carrying with it some of the accumulated solid material. This stream of water is discharged to a drain and obviously represents an economic loss.

In the usual boiler installation it is also customary to "blow down" the boiler by draining a portion of the water in the boiler from one or more connections (e.g., 14 and 16) in the bottom thereof provided for the purpose in order to remove the accumulation of solid materials which collect in the bottom of the boiler. This "blow down" is performed on a periodic basis and also obviously represents considerable economic waste since the hot, treated water is not recovered. Boiler 11 is also provided with a skimmer outlet 17 comprising a substantially horizontally positioned pipe which is placed at or slightly below the level of water in the boiler. The function of this outlet is to withdraw the floating solid materials suspended in the liquid within the boiler. The removal of these floating solids helps to prevent clogging the float-actuated controls described above and contributes materially to decreasing priming, foaming and surging of the boiler water.

In the process of the boiler treatment system of FIGURE 1, the float-actuated controls and the boiler itself are blown down on a continuous basis. Steady streams of water flowing through the housings of controls 12 and 13, from connections 14 and 16 in the bottom of the boiler, and from skimmer 17 are established, the rates of flow being controlled by valves 24, 26, 27, 28 and 29. The rate of flow of each of these streams must be sufficiently high to accomplish the removal of solid materials from the boiler. In a given installation, the flow rates required will obviously depend on the construction of the controls, the amount of solid material present in the boiler water, the size of the boiler, and the rate of make-up water addition. It has been found, however, that flow rates on the order of ¼ gallon per minute through each of the controls, about 25 gallons per minute from each of the taps in the bottom of the boiler, and about 15 gallons per minute from the skimmer are adequate to insure removal of the accumulated solid materials on a continuous basis from most boilers. These streams are combined in line 18, pass through check valve 19, recycle pump 31, line 35 and valves 32 and 33 to the inlet 34 of the combination deaerator and filter 36 embodying the principles of the present invention.

Control of the total dissolved solids concentration is achieved by valve 20 which permits a steady small stream of concentrated boiler water to be discharged to waste. Valve 20 may be set manually or operated by an automatic concentration controller 25 in well known fashion. The quantity of this "blow down" depends on the analysis of the raw makeup water, the number of times the makeup water may be concentrated in the boiler, and the percentage of makeup in the feed water. The indicated position of valve 20 is the preferred one, but it is understood by those skilled in the art that the "blow down" can be discharged from any convenient place on the boiler.

Boiler feed water, as called for by water-level control 13, is provided by feed water pump 37 from condensate or surge tank 38 and joins, through lines 39 and 41 and check valve 42, the combined streams leaving the boiler prior to entering the filter and deaerator. The makeup water is normally a mixture of warm or hot condensate returning to the boiler plus relatively cool raw water or water which has been deionized or softened by treatment in an ion exchanger (e.g., 76) in a conventional manner. The makeup water usually contains dissolved gases. In order to provide for the efficient removal in the deaerator of these dissolved gases, principally carbon dioxide, oxygen and nitrogen, in the combined stream entering the deaerator, it is necessary that the stream be heated to an elevated temperature, i.e., in the vicinity of its boiling point. At these elevated temperatures the solubility of the gases is greatly decreased and the gases come out of solution in the form of small bubbles. The actual temperature of the combined stream (i.e., recycle plus feed water) will obviously depend on the temperature and relative quantity of each stream. If this temperature is sufficiently high (i.e., at least 240° F. at 14.8 p.s.i.g.), no further heating is required. However, since higher temperatures are more efficient in causing the removal of dissolved gases, provision is made for passing the stream by means of valves 43 and 44 through heat exchanger 46, the heat source for which may be steam provided from the boiler itself or from any other convenient source.

The combination deaerator and filter 36, shown in detail in FIGURES 3 and 4, serves the dual function of de-entraining gases from the entering liquid stream and also of filtering suspended solid material therein. In the preferred embodiment this unit comprises a cylindrical vessel 47 containing a deaerator 48 in the form of a truncated cone having a closed bottom 49 and open top 51. Water entering the deaerator through inlet 34 impinges on baffle plate 52 which impedes the vertical movement of the water stream and diverts the flow to a horizontal helical direction, thereby insuring that the water progresses uniformly and smoothly from the bottom of the cone to the top rather than by-passing any portion of the deaerating zone.

The size of the deaerator 48 should be such that the average residence time of the water therein is in the range of about 0.5–5 minutes, and preferably about 2 minutes. Within the cone the entering bubbles of gas which were liberated from solution on heating tend to accumulate along the sides of the cone wall and coalesce into larger bubbles as the water moves upwardly. Because of the decreasing cross-sectional area in an upward direction in the cone, the velocity of the water travelling therein increases as the top of the cone is approached. As a result of the buoyant forces on the bubbles, the bubbles travel at a higher velocity than the stream of water leaving the top of the cone and have a tendency to continue in an upward direction and accumulate in the top of vessel 47, from which point the gases are vented as required by vent valve 53 (FIGURE 1).

Surrounding cone 48 in vessel 47 there is a tubular filter screen 54 which defines with the walls of the vessel an annular passageway for filtrate which is closed at its top and bottom. Positioned in the annular space between the walls of vessel 47 and the filter screen 54 is a baffle 56 having openings for the passage of water therethrough which serves as a spacer to prevent collapse of the screen against the walls of the container. Filter 54 may be a woven metal or punched screen having suitably fine pores or a combination of a metal screen with a conventional filter cloth, but preferably one resistant to elevated temperatures and boiler water, such as Saran, nylon or other synthetic cloths or glass fiber cloth.

In the operation of the filter, the water passes through the filter screen into the annular zone adjacent the walls of vessel 47 and leaves the vessel through filtrate outlet 57. The suspended solid material which the water contains is deposited on the face of the filter screen or cloth. In order to avoid unduly rapid plugging of the filter and to improve the filtering efficiency thereof, it is preferred to employ a filteraid in conjunction with the filtering operation. The filteraid may be any of the known and conventionally used filteraids, such as diatomaceous earth, cellulose, finely divided carbon, etc. Provision is made in the system for establishing a precoat of filter aid by means of precoat pot 58 which contains a supply of the filteraid. In order to form the precoat the stream in line 35 is diverted through the precoat pot by means of valves 59 and 32, wherein it picks up the filteraid. After a sufficient coating of filteraid is formed on the walls of the filter, the precoat pot is by-passed and flow through valve 32 is re-established.

After a period of operation the accumulated filtered materials on the face of the filter make filtering inefficient. When this point, indicated by excessive pressure drop across the filter, is reached, washing of the accumulated solids from the face of the screen is indicated. During the period while washing is in progress, feed water to the boiler by-passes the filter and deaerator through valve 61 and enters the boiler directly. Prior to washing, vessel 47 is drained through valve 69 to waste. In order to permit air to enter the vessel during the draining period, there is provided a suitable check-valve 45 (FIGURE 1) which functions to break any vacuum which is formed in the vessel. Washing of the filter is accomplished by a stream of water which enters the filter unit through a centrally located vertical pipe 62 which is equipped with a baffle 63 over the open end thereof. Raw water entering pipe 62 through valve 64 impinges on baffle 63 and is directed to the upper surface of filter 54 from which it flows down across the filter washing the filteraid and accumulated solids therefrom to the bottom of vessel 47 through the annular spaces formed by the bottom of cone 48, the walls of vessel 47, and the members (e.g., 66 and 67) which support the cone in the vessel. From the bottom of vessel 47 the solids are discharged through line 68 and valve 69 to waste.

As an added protection for the boiler, by-pass relief valve 75 may be incorporated between line 41 and the boiler so as to allow sufficient feed water to enter the boiler in the evnt of excessive pressure drop across the filter.

After washing is complete the flow is re-established through the filter, a precoat of filteraid is established as described above and normal operation of the filter and deaerator is resumed.

In order to overcome the corrosiveness of any remaining dissolved gases, principally carbon dioxide and oxygen, in the stream leaving the filter and in order to aid in the removal of objectionable impurities therein, there is added to the stream a supply of water treating chemicals, the function of which is well known to those skilled in the art. These chemicals may consist of such treating agents as morpholine, sodium silicate, ligno-sulfonates, various sodium phosphates, sodium sulfite, hydrazine, and other treating agents, and mixtures thereof. The function of the treating chemicals is to control the characteristics and compositions of the water. Typical controls made are those to adjust the pH of the water to a value within the range of about 9.5 to 12, to adjust alkalinity, and to cause the precipitation of hardness and other objectionable constituents in the water as will be understood by those skilled in the art. The precipitates which form as a result of the chemical treatment are removed by the filter during the recycling of the water. The rate of addition of the chemicals is controlled by valve 71 which operates in conjunction with a conventional flow rate controller 72 to control the operation of chemical feed pump 73. The required rate of addition of chemicals is obviously controlled by the rate of water flow and the concentration of undesirable constituents therein in addition to the degree of acidity or alkalinity of the water, as will be appreciated by those skilled in the art.

The rate at which the boiler water must be recycled obviously depends in the ultimate analysis on the nature of the raw water supply and the percentage of raw make-up water in the feed water. Obviously raw water containing higher proportions of dissolved and entrained constituents will require greater extend of treatment than water which is relatively free of the same. As an approximation, it has been found that for the average installation the water in the boiler should be recycled through the system at about three times per hour, although this is subject to wide variation.

The foregoing detailed description has been given for clearness of understanding only, and no unnecessary limitations should be understood therefrom, as modifications will be obvious to those skilled in the art.

We claim:

1. A combination degasifier and filter for treating boiler liquid and the like comprising a closed vessel having a filtering surface, a degasifying zone within said vessel comprising a compartment, said compartment being closed except for a single inlet means and a single outlet means, said inlet means being provided adjacent the bottom of said compartment for accommodating a liquid in which is suspended small gas bubbles, said compartment including an upwardly decreasing cross-sectional area having an inner wall along which gas bubbles coalesce to form larger bubbles for moving upwardly with respect to the liquid by virtue of their relative densities, said outlet means being located adjacent the top of said compartment and through which passes separated gas and liquid, means in the top of said vessel for permitting the escape of collected non-condensible gas, and second outlet means in said vessel for said degasified liquid.

2. A combination degasifier and filter for treating boiler liquid and the like comprising a closed vessel, filter means located within said vessel, a degasifying zone within said vessel including structure having a closed bottom and closed sides defining an upwardly decreasing cross-sectional area, single inlet means provided in the lower end of said structure for accommodating a liquid in which are suspended small gas bubbles, said closed bottom and closed sides being in sealed relation so that said liquid and gas bubbles move upwardly within said structure, said gas bubbles coalescing along the closed sides to form larger bubbles, outlet means defined adjacent the top of said structure through which separated gas and water pass, outlet means defined in said vessel for permitting the escape of collected non-condensible gas, and outlet means defined in said vessel for accommodating outlet flow of degasified liquid.

3. A combination degasifier and filter for treating boiler water and the like comprising a closed substantially cylindrical, vertically positioned vessel; tubular filter means within said vessel defining with the walls thereof an annular filtrate collection zone having a filtrate outlet; a degasifying zone within said vessel comprising a hollow truncated cone positioned such that its cross-sectional area decreases in an upward direction; said cone having a closed bottom and closed upwardly converging sides in sealed relation to said closed bottom, inlet means located adjacent the lower end of said cone through which pass a liquid in which are suspended small gas bubbles, said gas bubbles coalescing along the converging sides to form larger gas bubbles, and an opening means adjacent the upper end of the cone through which pass separated gas and water; means within said container for washing filtered solid material from said filter means; and means in the top of said vessel for permitting the escape of collected non-condensible gases.

4. The apparatus of claim 3 which includes baffle means associated with the inlet means to said deaerating zone for inhibiting the flow of liquid through said inlet means in an upward direction.

5. The apparatus of claim 3 wherein said washing means comprises a vertical centrally located conduit, the exit end of which is above the top of the truncated cone, and baffle means located above said exit and for diverting a stream of washing liquid to the said filter means.

References Cited in the file of this patent

UNITED STATES PATENTS

| | | |
|---|---|---|
| 735,192 | Allert | Aug. 4, 1903 |
| 2,010,435 | Matheson | Aug. 6, 1935 |
| 2,434,596 | Spieth | Jan. 13, 1948 |
| 2,511,967 | Campbell | June 20, 1950 |
| 2,811,218 | Winslow | Oct. 29, 1957 |
| 2,804,172 | Sender | Aug. 27, 1958 |
| 2,852,091 | Boudreaux et al. | Sept. 16, 1958 |
| 2,870,865 | Fenart | Jan. 27, 1959 |